United States Patent [19]

Fischer et al.

[11] Patent Number: 5,725,456
[45] Date of Patent: Mar. 10, 1998

[54] METHOD OF REGULATING THE OPERATION OF A TORQUE TRANSMISSION APPARATUS

[75] Inventors: Robert Fischer, Bühl; Jochen Stinus, Inzlingen, both of Germany

[73] Assignee: Luk Getriebe Systeme GmbH, Bühl, Germany

[21] Appl. No.: 469,030

[22] Filed: Jun. 6, 1995

[30] Foreign Application Priority Data

Oct. 29, 1994 [DE] Germany ............... 44 38 689.3

[51] Int. Cl.⁶ ............... F16D 3/14; F16D 13/64
[52] U.S. Cl. ............... 477/174; 477/169; 477/175; 477/176
[58] Field of Search ............... 477/169, 176, 477/174, 175, 180; 192/70.17, 30 V, 3.29, 3.3

[56] References Cited

U.S. PATENT DOCUMENTS

| | | | |
|---|---|---|---|
| 4,468,988 | 9/1984 | Hiramatsu | 477/176 X |
| 4,679,679 | 7/1987 | Lech, Jr. et al. | |
| 4,693,354 | 9/1987 | Umeyama et al. | |
| 4,698,045 | 10/1987 | Billet et al. | |
| 4,716,988 | 1/1988 | Tsukamoto et al. | 192/3.3 |
| 4,724,719 | 2/1988 | Werner et al. | 192/30 V X |
| 4,735,297 | 4/1988 | Koshimo | 464/68 X |
| 4,890,707 | 1/1990 | Suzuki | 192/3.3 |
| 4,950,204 | 8/1990 | Umeyama et al. | 464/64 X |
| 4,966,261 | 10/1990 | Kohno et al. | 192/3.29 |
| 5,052,978 | 10/1991 | Hanke | 464/68 X |
| 5,086,894 | 2/1992 | Iizuka et al. | 477/176 X |
| 5,226,513 | 7/1993 | Shibayama | 192/3.3 X |
| 5,289,737 | 3/1994 | Kuhne | 192/106.2 X |

FOREIGN PATENT DOCUMENTS

| | | |
|---|---|---|
| 3438594 A1 | 4/1986 | Germany. |
| 4239289 A1 | 5/1993 | Germany. |
| 4239291 A1 | 5/1993 | Germany. |
| 4306505 A1 | 9/1993 | Germany. |
| 4322677 A1 | 1/1994 | Germany. |

*Primary Examiner*—Khoi Q. Ta
*Attorney, Agent, or Firm*—Darby & Darby

[57] ABSTRACT

The slip of a friction clutch between the engine and the transmission of a motor vehicle is regulated in such a way that the clutch is caused to operate with slip during transmission of torque which exhibits undesirable vibrations while the the RPM of the engine is within a first partial range, and that the clutch is prevented from operating with slip during transmission of torque which exhibits undesirable vibrations while the RPM of the engine is within second partial range.

18 Claims, 5 Drawing Sheets

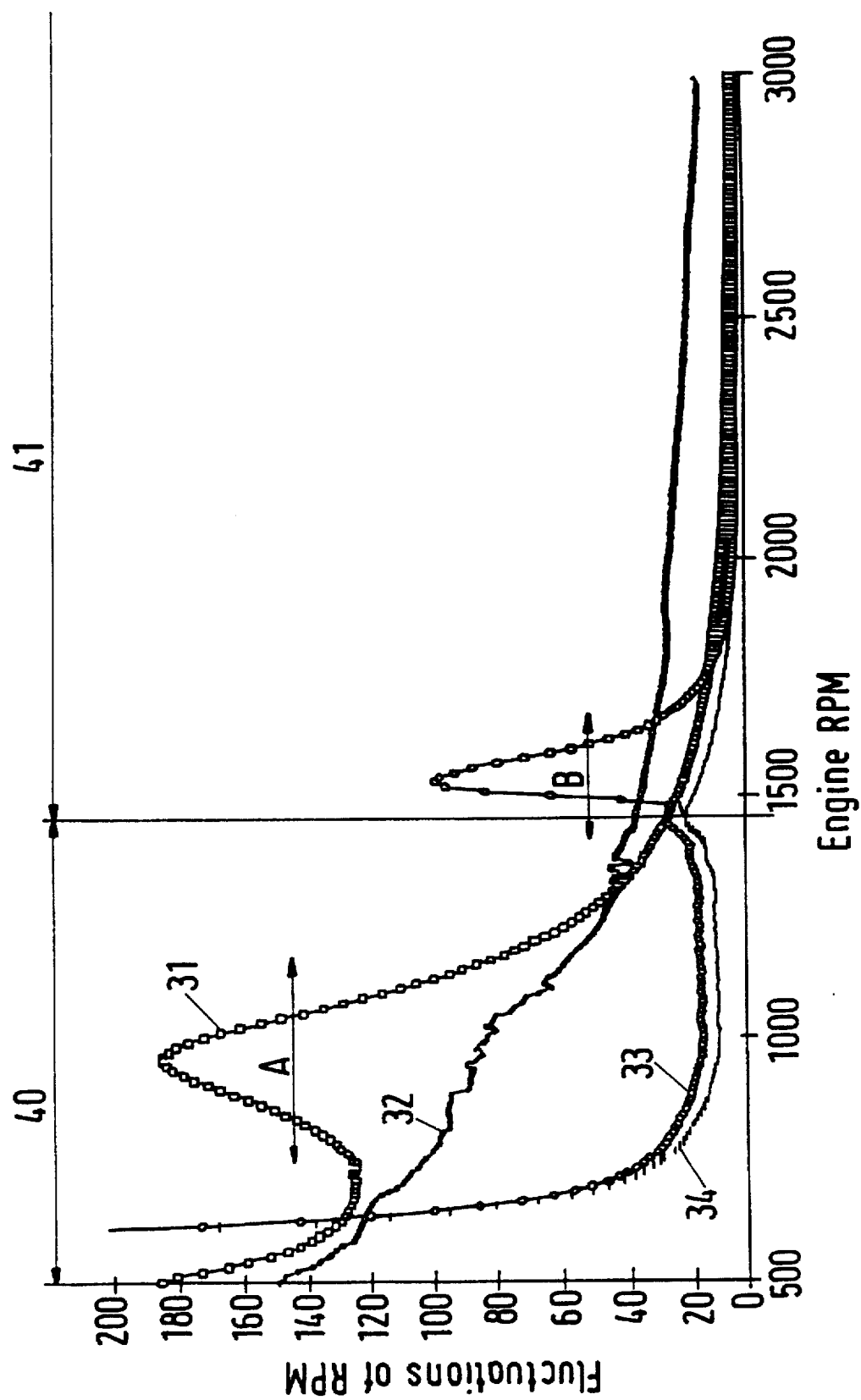

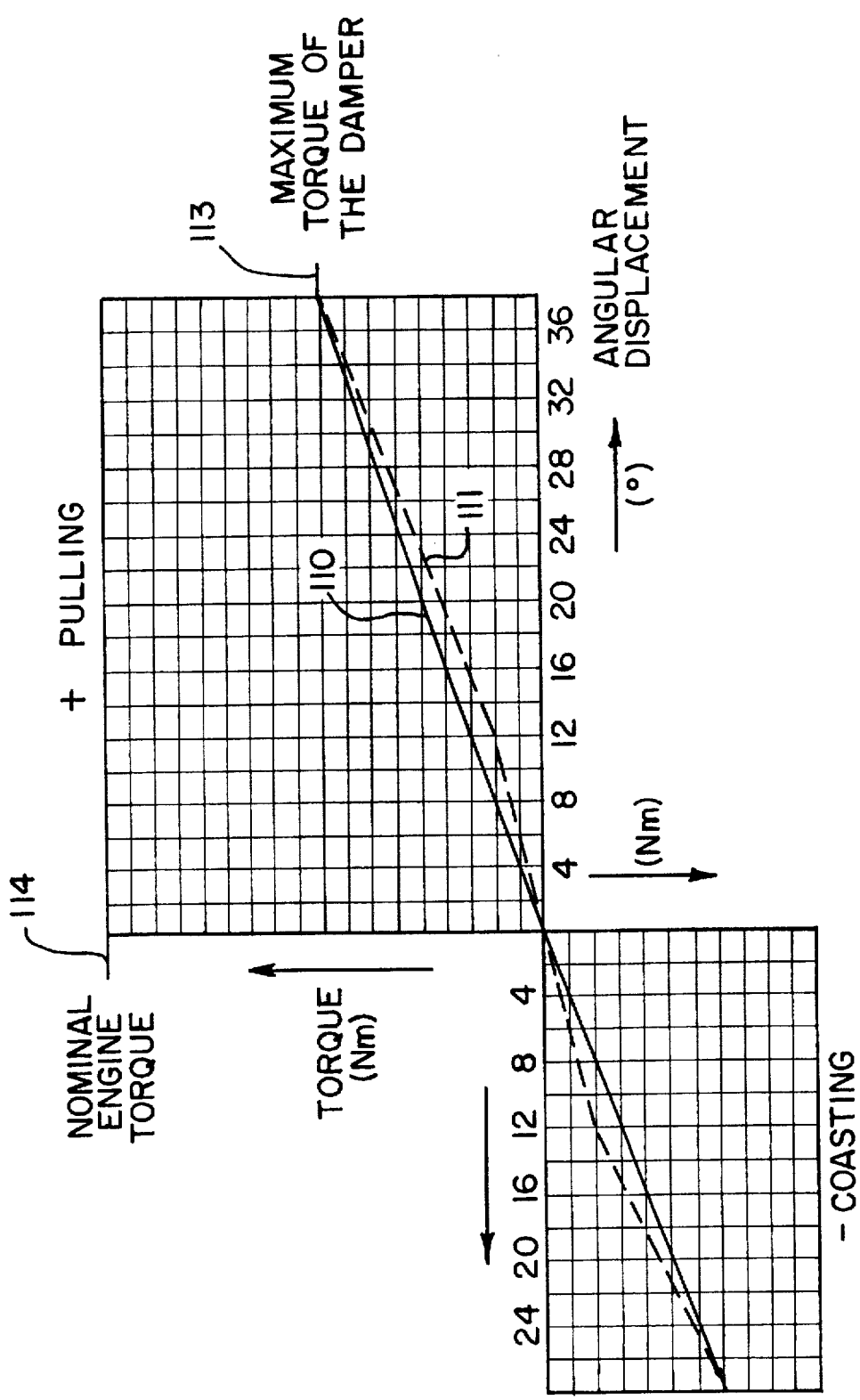

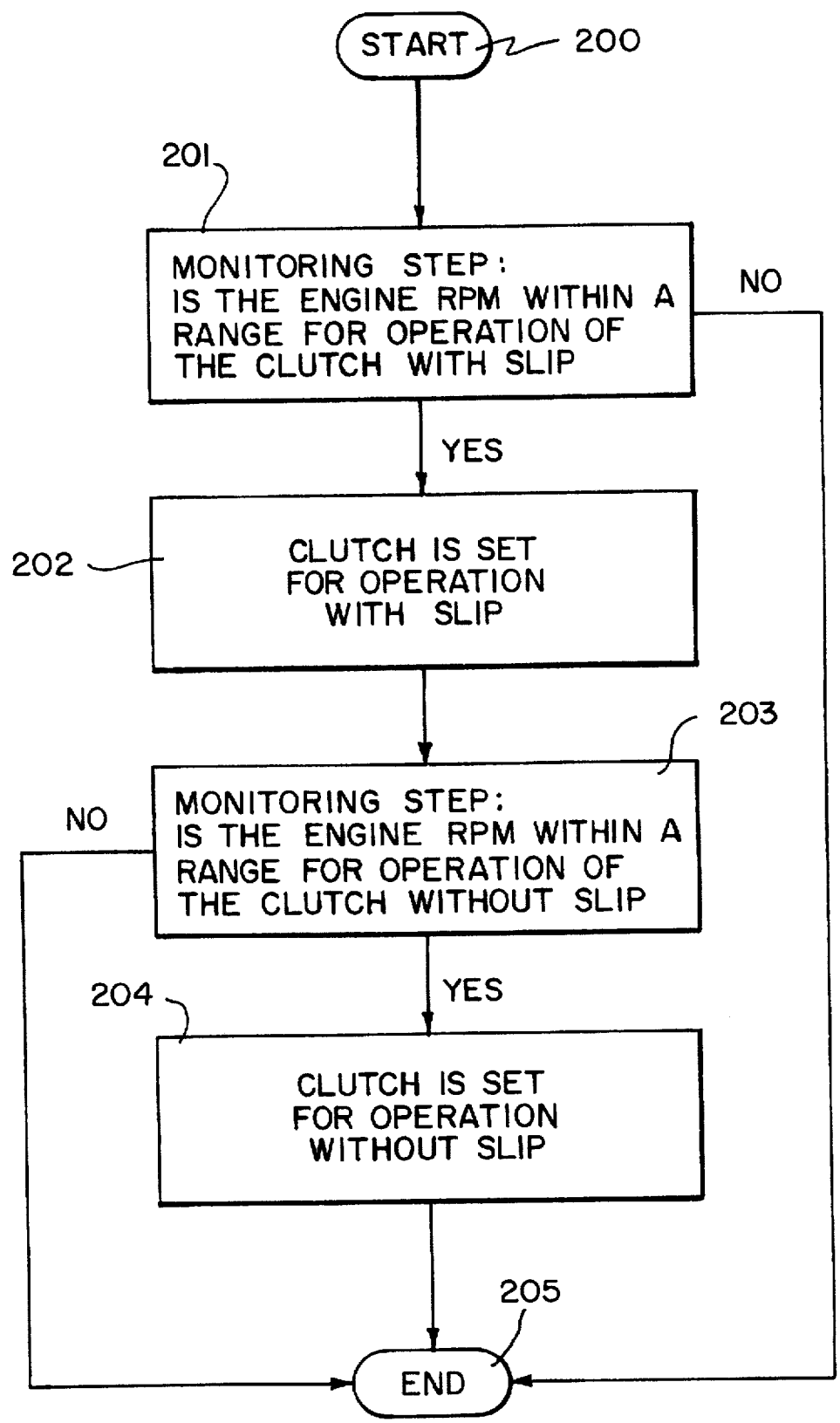

METHOD OF REGULATING THE OPERATION OF A TORQUE TRANSMISSION APPARATUS

BACKGROUND OF THE INVENTION

The invention relates to a method of regulating torque transmission systems. It is known in the automobile field that, due to their mode of operation, combustion engines generate cyclically recurring irregularities in the transmission of torque, i.e., torsional vibrations. For example, such irregularities of torque transmission are imparted to the power train of a vehicle.

The irregularities of torque transmission, i.e., torsional vibrations, which are superimposed upon the uniform rotary movement of the output shaft of a combustion engine and are applied to the power train of a motor vehicle can generate and/or intensify resonant vibration of the power train in the useful RPM range of the motor or combustion engine which, in turn, can adversely affect the comfort, e.g., due to the generation of noise. Such resonance behavior is quite clearly discernible in motor vehicles without torsional vibration dampers wherein the fluctuation of RPM can be ascertained as the difference between average transmission RPM and the RPM of the input shaft of the transmission.

In order to damp torsional vibrations in accordance with the teachings of prior art, one employs torsional vibration dampers which comprise systems of springs with single- or multistage spring characteristics and/or frictional damping systems exhibiting a constant, variable or stepped frictional behavior. The prior art also proposes torsional vibration dampers with a main damper and a front damper at least one of which can constitute a multistage damper.

Torsional vibration dampers of the aforementioned type are known, for example, from U.S. Pat. Nos. 4,698,045, 4,693,354 and 4,679,679.

Furthermore, published German patent application 3438594 discloses, for the purposes of damping torsional vibrations, the application of slip in such a way that the slip is increased in resonance-like fashion at the boundaries of torsional vibration resonances of the slipping system.

In accordance with prior art proposals, those systems which rely on slip for damping of torsional vibrations are equipped with a rigid clutch disc which does not contain any torsional vibration dampers.

OBJECTS OF THE INVENTION

An object of the invention is provide a regulating method which is susceptible of as universal application as possible and which ensures the damping of torsional vibrations in a propulsion system by planned operation of the clutch while simultaneously ensuring that the incorporation of the torsional vibration damper does not necessitate the utilization of a large number of parts, i.e., that the construction of the torsional vibration damper is as simple as possible in order to achieve an inexpensive solution of torsional vibration damping in addition to a reduction of the number of component parts. Accordingly, the novel method of regulating the operation of torque transmission systems should ensure, together with a torsional vibration damper of simple design, that the cost will be more acceptable than that of an expensively equipped torsional vibration damper. At the same time, and in order to damp or insulate torsional vibrations by resorting to slip, the slip should be controlled in such a way that one arrives at a method which is satisfactory to the consumer and permits a reduction of wear.

SUMMARY OF THE INVENTION

The object is accomplished in that one employs, in combination with a torsional vibration damper of simple design and having a simple spring-damper characteristic, a method of regulating a torque transmission system according to which the slip between two component parts of the torque transmission system is intentionally controlled as a function of characteristic values in order to damp or insulate torsional vibrations. In accordance with the novel method, the insulation or damping of torsional vibrations in the region of the torsional vibration resonances is achieved by planned or purposeful reliance upon or by planned or purposeful prevention of slip. By relying on planned prevention of slip in regions with resonant torsional vibrations, one prevents in a slipping system any further increase of slip for the purposes of damping torsional vibrations which has a positive influence upon the consumption as well as upon wear.

The regulation of slip between the component parts of a torque transmission system, such as a friction clutch, is carried out in such a way that the useful RPM range of the engine RPM is divided into at least two partial ranges or sections and a purposefully selected or calculated slip is established in at least one of these partial ranges whereas, in at least one other partial range the slip is intentionally prevented or suppressed or is reduced in a planned manner in order to damp torsional vibrations in a prearranged manner.

The characteristic of the transmission RPM, or more specifically the RPM fluctuation which constitutes the RPM differential between the engine RPM and the transmission RPM as a function of the engine RPM exhibits, as a rule, resonance maxima of torsional vibrations in the power train of the motor vehicle, and such maxima are suppressed or at least reduced with assistance from torsional vibration dampers.

The state of prior art encompasses a method of damping vibrations which, with assistance from torsional vibration dampers having single- or multistage spring characteristics and with simple single-stage or variable or multi-stage frictional behavior, shifts the locus of the resonance maximum into an RPM range which is not critical as concerns the RPM range of the main driving range and as concerns the transmission of vibrations because such RPM range is below the idling RPM so that one can achieve a damping of vibrations with assistance from a torsional vibration damper.

In accordance with another possible design of the torsional vibration damper in a torque transmission system, one resorts to planned utilization of torsional vibration dampers with single- or multistage spring characteristics and with variable, constant or multistage friction behavior in order to ensure that an increase of resonance is not shifted entirely into the RPM range below the idling RPM so that, as a result of damping, one arrives at a lower-amplitude resonant vibration.

The reliance upon planned increased additional frictional damping leads, in the range of resonance, to a lowering of the amplitude of fluctuations of the RPM. In an RPM range with rotational speeds above the resonance RPM, frictional damping results in an increase of the fluctuation of RPM.

An embodiment of the invention involves a method of regulating torque transmission systems with a torque transmission system in the power train of a motor vehicle which, due to mechanical characteristics of the entire power train, exhibits a special characteristic in regard to torsional vibrations so that the mechanical characteristics and the vibration characteristics of the power train when the vehicle is in use and the clutch is engaged to operate without slip depart from the mechanical characteristics and the vibration characteristics of the power train when the operation takes place with slip.

The characteristic vibration behavior of the power train when the operation takes place with slip normally involves the development of resonance RPMs which are different from the resonance RPMs of the mechanical system of the power train when the operation is carried out without slip.

Due to the novel planned or intentional reliance on slip within predetermined partial ranges of the main driving range and due to the novel planned or intentional absence of slip in predetermined partial ranges of the main driving range when the torque transmission system is in use, the development of resonant vibrations within the entire RPM range of the engine can be taken into consideration in such a way that, when the torque transmission system does not slip in actual use the increased resonance in an RPM range is suppressed or damped in that the slip is selected in a planned manner; when the resonance develops at another RPM while the torque transmission system slips in actual use is suppressed or damped in that, should the RPM be above or below the resonance RPM while the system operates with slip, the development of slip is prevented to thus set up a quasi non-slipping system. For example, a system can be said to be non-slipping when the development of slip for the purpose of damping torsional vibrations is prevented but a short-lasting slip in response to the development of short-lasting torque peaks is still possible.

Depending on the particular application and upon the mechanical relationships in particular power trains of various vehicles, the resonance RPM of the non-slipping system can be lower, equal to or higher than the resonance RPM when the system operates with slip. In accordance with the novel regulating method, damping of vibrations—and more particularly a damping of torsional vibrations—can be achieved in that the novel system can discriminate, in a planned fashion, between a condition of operation with slip and a condition of operation without slip. The regulation is selected in such a way that, if resonant vibration develops during operation with slip, one shifts to operation without slip. Inversely, if resonant vibration develops while the operation is being carried out without slip, one shifts to an operation with slip.

In accordance with the invention, the object is accomplished in that, in the case of torque transmission systems, a torsional vibration damper insulates irregularities of the torque at least within a partial range of the nominal engine torque and torsional vibrations are damped as a result of planned or intentional operation with or prevention of slip. In dependency upon the characteristic values, the useful RPM range of the engine RPM is divided into at least two partial ranges. At least one of such partial ranges is selected for operation with slip in order to damp torsional vibrations, and at least one other partial range is selected for operation without slip or for prevention of the development of slip in order to damp torsional vibrations.

The object of the invention can also be accomplished in that one provides a torque transmission system with a clutch having a clutch disc which is provided with at least one torsional vibration damper. During operation within an RPM range in which the system exhibits a torsional vibration resonance in the power train without slip, one resorts to slip in order to damp torsional vibrations. On the other hand, when the operation takes place within an RPM range in which the system operates with slip but exhibits a resonant vibration, the damping of torsional vibrations is achieved by at least substantially preventing the development of slip so that the clutch is in a condition to transmit torque essentially without slip.

It can be of advantage if the novel regulating method is practiced in such a way that, in order to achieve a preferred torsional vibration damping within various partial ranges, the slip is selected or prevented or varied in dependency upon characteristic RPMs or characteristic values or in dependency upon the progress of the RPM through specific threshold values.

It can be of advantage for the novel method of regulating a torque transmission system to divide the useful RPM range of the engine into two RPM ranges and slip is resorted to for the purposes of torsional vibration damping within one of these two ranges whereas, in another of the two RPM ranges, torsional vibration damping is achieved intentionally without slip.

The novel method can be realized with advantage in that the torsional vibration damper is designed without additional frictional damping or in such a way that there exists a very small frictional damping in the torsional vibration damper.

Furthermore, it can be of advantage when the torsional vibration damper comprises a damper the maximum twisting moment of which is less than the nominal torque of the combustion engine.

It can also be of advantage if the torsional vibration damper constitutes a damper the maximum twisting moment of which is less than the nominal torque of the combustion engine.

It can be of advantage to design one novel embodiment in such a way that the torsional vibration damper comprises a torsionally elastic vibration damping device which exhibits a single-stage spring characteristic.

It can be of advantage for the novel design if the torsional vibration damper exhibits a multistage spring characteristic.

In accordance with a further advantageous embodiment, the torsional vibration damper can comprise a damping device with at least one pair of springs which are compressible in the direction of pull as well as in the direction of coasting of the vehicle.

In accordance with a further development of the novel concept, a resonant vibration which develops when the torque transmission system is operated with slip is damped by intentionally reducing or preventing the slip whereas, when operating without slip, resonant vibration which develops under such circumstances is damped by intentional or planned selection of a predetermined slip.

It can be of advantage to resort to an embodiment of the invention according to which a control- or monitoring system can discriminate between at least one range with operation with slip and at least one range with operation without slip on the basis of measurement signals and/or system input values, and the slip can be selected in the respective ranges in a prearranged or planned manner in dependency upon the measurement signals and/or system input values.

It can also be of advantage if, in order to achieve an isolation of vibrations, the slip to be selected in at least one of the partial ranges does not exceed a parameter-dependent threshold value of 10 $min^{-1}$ to 200 $min^{-1}$.

Furthermore, it can be of advantage if the slip to be selected in one partial range is within a range of 20 $min^{-1}$ to 150 $min^{-1}$, preferably within a range of 20 $min^{-1}$ to 100 $min^{-1}$.

It is of advantage if, for the purposes of isolating vibrations, the slip is applied only within a narrow RPM range.

It can be of advantage if, in the RPM ranges in which the slip is being resorted to in order to isolate torsional vibrations, the applied slip is regulated as a function of the engine RPM and/or the engine torque and/or the temperature and/or the position of the throttle valve and/or the velocity of changes of the angle of the throttle valve and/or the pressure in the suction manifold and/or the positions of the pedal.

Furthermore, it can be of advantage if, in the RPM range within which the slip is being resorted to as a function of the engine RPM in order to isolate vibrations, the slip exhibits a local maximum and the slip continuously decreases in a direction toward at least one marginal zone of the RPM range.

In accordance with the novel concept, it can also be of advantage to realize a method of regulating a torque transmission system wherein a torsional vibration damper isolates and/or damps irregularities of torque and torsional vibrations are damped as a result of planned or intentional establishment or prevention of slip and wherein the useful RPM range of the engine RPM is divided into at least two partial ranges in dependency upon characteristic values. Slip is being resorted to in at least one of the partial ranges in order to achieve damping of torsional vibrations and there is selected at least one further partial range in which no slip is being relied upon to or in which the development of slip for the purpose of damping of torsional vibrations is intentionally prevented. The vibration insulating and/or vibration damping characteristics and/or the design of the torsional vibration damper for a partial load range of the nominal engine torque is optimized for a planned application and/or planned absence of slip.

BRIEF DESCRIPTION OF THE DRAWINGS

The invention will be explained in greater detail with reference to the drawings showing an embodiment pertaining to the field of vehicles. There are shown in:

FIG. 2: a signal diagram wherein the fluctuations of RPM are shown as the RPM difference between the average transmission RPM and the transmission RPM as a function of engine RPM, four different situations being shown, FIG. 4: a diagram showing the characteristics of two different types of springs which can be utilized in the clutch disc of FIG. 3, FIG. 5: a flow chart with blocks denoting a series of steps forming part of the improved method.

DESCRIPTION OF PREFERRED EMBODIMENTS

Figure 1:
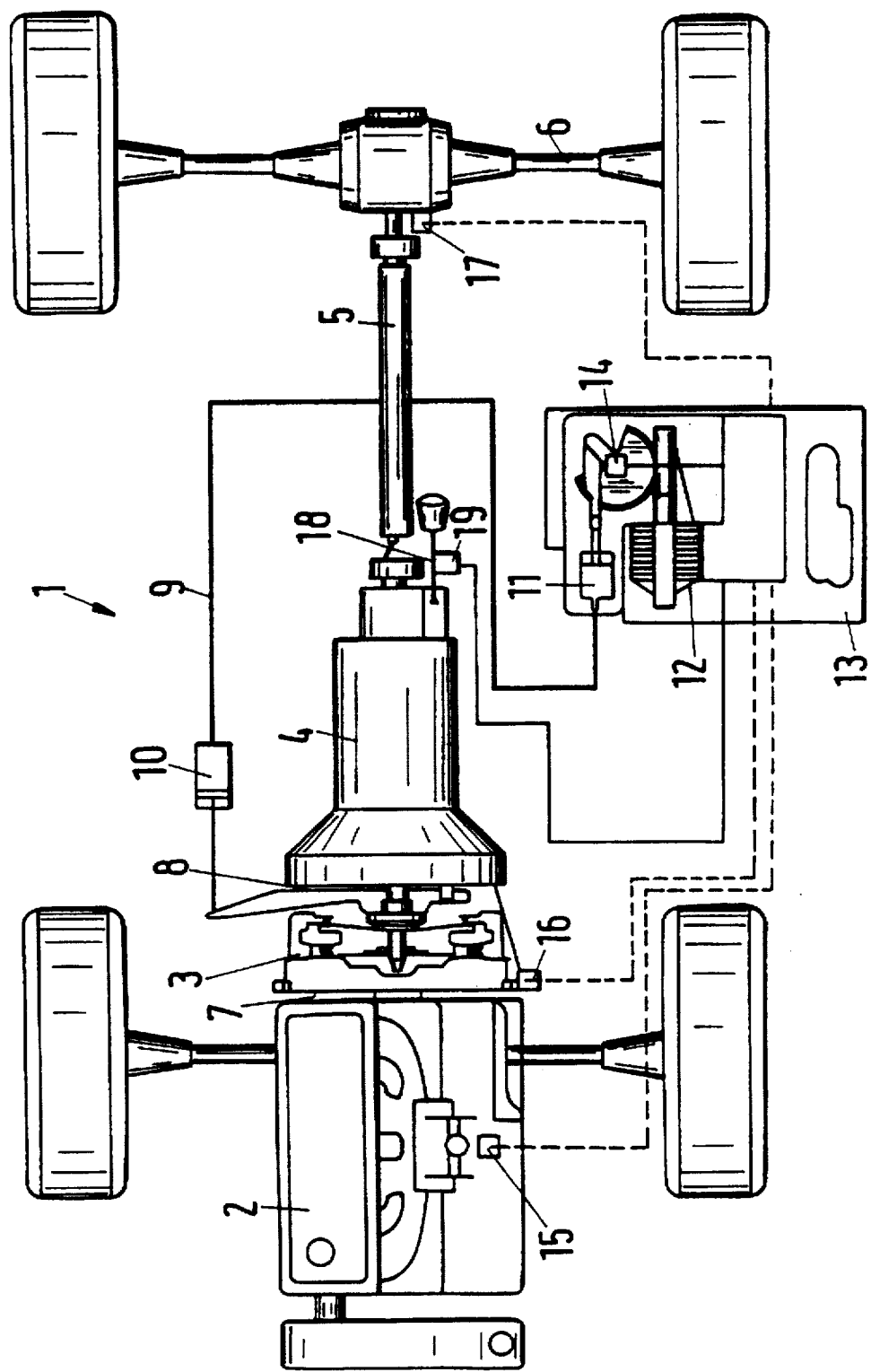
FIG. 1: a schematic illustration of a vehicle with a torque transmission system.

FIG. 1 shows a vehicle 1 with a combustion engine 2. A clutch 3, such as a friction clutch, is installed between the combustion engine 2 and the transmission 4.

The clutch 3 is installed in the power- and torque flow between the engine 2 and the downstream transmission 4 in such a way that the torque to be transmitted can be transmitted by the clutch 3 in a controlled manner. At the same time, irregularities of torque or torsional vibrations can also be transmitted to the power train.

In order to damp torsional vibrations, the clutch disc can be provided with a torsional vibration damper which exhibits a single- or multi-stage spring characteristic and/or can be provided with friction damping elements.

The friction clutch can be a self-adjusting or self-compensating clutch.

The transmission 4 is connected with a driving axle 6 of the vehicle by a drive shaft 5. In the friction clutch 3, one distinguishes between a driving side 7 which is adjacent the engine 2 and a driven side 8 confronting the transmission 4.

An element which can engage or disengage the torque transmitting parts of the clutch in a planned or purposeful manner can be connected with a hydraulic conduit 9 which comprises a slave cylinder 10. The hydraulic conduit 9 is connected, by way of a master cylinder 11, with the electric motor 12. The electric motor 12 and the master cylinder 11 are assembled into a setting or regulating element 13 within a housing. A clutch distance sensor 14 is installed in the same housing immediately adjacent the master cylinder 11. In addition, the housing for the setting element 13 can further accommodate a regulating apparatus, not shown, which is mounted on a circuit board.

The regulating apparatus is connected with a throttle valve sensor 15 which is mounted directly at the combustion engine, with an engine RPM sensor 16, and with a tachometer sensor 17 which is disposed at the driving axle 6. The vehicle 1 further comprises a shifting lever 18 which acts upon the transmission 4 by way of a shifting linkage. A shifting distance sensor 19 is provided on the shifting lever 18 and this sensor is also connected with the regulating apparatus in a signal-transmitting manner. The regulating apparatus transmits to the electric motor 12, for the purpose of actuating the clutch, a setting value in dependency upon the measured values or signals of the attached sensor system (14, 15, 16, 17, 18, 19). To this end, a control program in the form of hard- or soft ware is implemented in the regulating apparatus.

The electric motor 12 acts upon the self-adjusting clutch 3 by way of the hydraulic system (9, 10, 11) in response to signals from the regulating apparatus. The mode of operation of the coupling 3 is already fully described in the published German patent applications Nos. 42 39 291 (corresponding to U.S. Pat. No. 5,409,091 granted Apr. 25, 1995), 43 06 505 (corresponding to U.S. patent application Ser. No. 08/026,588 filed Mar. 5, 1993), 42 39 289 (corresponding to U.S. Pat. No. 5,450,934 granted Sep. 19, 1995) and 43 22 677 (corresponding to U.S. patent application Ser. No. 08,211,020 filed Jan. 6, 1995). Note that it is herewith specifically pointed out that the disclosures of the just enumerated U.S. patents and U.S. patent applications are to be considered as forming part of this description of the present invention.

A further possible embodiment of the invention can be arrived at in that the actuation of the torque transmission system is caused to result in action upon the clutch by way of a mechanical actuating device so that the clutch can be moved between an engaged position and a disengaged position in order to ensure that it can carry out the functions of torque transmission and damping of torsional vibrations.

If one is to employ a mechanical actuating system, it is possible to use a linkage which is driven and which can be positioned by a servomotor, which is connected with a disengaging fork and which regulates a movement of the disengaging fork. The disengaging fork is connected with a disengaging bearing of the clutch 3 and the clutch can be engaged or disengaged on purpose in response to a planned movement of the disengaging bearing.

The torque transmission system can also constitute a starter clutch of an automatic transmission, such as for example an infinitely variable transmission with sheaves and belts trained over the sheaves, and the starter clutch can be operated in a planned manner.

In order to damp torsional vibrations, it is possible to rely on planned application of slip in the torque transmission system.

In such instance, one can distinguish basically between two different mechanical systems or models because, when the torque transmission system is operated with slip, the power train exhibits mechanical characteristics which are different from those of the same power train when the torque transmission system is operated without slip, i.e., for example the resonance frequencies of these two systems are different. This fact is illustrated and clarified in FIG. 2.

In FIG. 2, the characteristic of the fluctuation of RPM is represented as a function of the engine RPM. The curve 31, which includes a series of unfilled squares, denotes the fluctuations of RPM of a torque transmission system of conventional design as a function of the engine RPM, no torsional vibration damper or no optimized torsional vibration damper being used and the system being operated without slip. It can be seen that, when the RPM is low, there develops a resonance maximum between approximately 800 and 1200 RPM and such maximum has a width A. The fluctuation of RPM decreases considerably in a direction toward higher RPM values.

In order to optimize such progress 31 of fluctuations of RPM as a function of the engine RPM, the prior art proposes to employ an optimized torsional vibration damper. If such an optimized damper is utilized in a torque transmission system, it causes a reduction of the amplitude of resonance and/or a shift of resonance frequency as shown in FIG. 2 by the curve 32. The utilization of an optimized damper with various multistage spring characteristics and with an optimized frictional damping, which can be a single- or multistage damping, results in that the resonance maximum is reduced within an RPM range of between about 800 and 1200 revolutions per minute. The utilization of such optimized damper results in a pronounced increase of fluctuations of RPM within the RPM range above approximately 1400 revolutions per minute, when compared with the system without an optimized damper and operating without slip.

On the other hand, if one employs a simple torsional vibration damper without an additional frictional damping arrangement and having a simple spring characteristic, and if one resorts to planned slip in order to damp vibrations, one arrives in the power train at a fluctuation of RPM, in dependency upon the engine RPM, as indicated by the curve 33.

At low RPM values up to approximately 1500 revolutions per minute, one achieves a pronounced reduction of fluctuations of the RPM. When the RPM is approximately 1500 revolutions per minute, there develops and one can observe a resonance curve of the slipping system which, due to different characteristics of the power train in the event of slip, can develop at a considerably higher RPM of the engine than the resonance RPM of the essentially closed non-slipping system. Such resonance at higher RPM values can develop when the slip of the torque transmission system is not very pronounced so that a torque is being transmitted in spite of the existence of slip. The RPM fluctuation for engine RPM values above the resonance RPM, namely outside of the resonance range B, is clearly less than in the case of a non-slipping system with an optimized damper.

If one employs a regulating method in accordance with the inventive concept, which relies upon slip in a planned manner in order to achieve a damping of torsional vibrations, one arrives at the characteristic curve 34.

Slip is being relied upon within a first RPM range 40 in order to suppress the resonance line A of the closed system. The slip is intentionally avoided within the RPM range 41 above 1500 revolutions per minute in order to suppress the resonance of the slipping system B. In this manner, one achieves that the fluctuation of RPM as a function of engine RPM in the useful RPM range above the idling RPM is invariably less than the RPM fluctuation which can be arrived at with assistance from a torsional vibration damper of the optimized character but without slip.

In order to achieve damping of vibrations which is required in the RPM range 41 when operating without slip, the torque transmission system can comprise a torsional vibration damper which exhibits a simple one-stage characteristic and/or which is effective only within a portion of the nominal engine torque.

Figure 3:
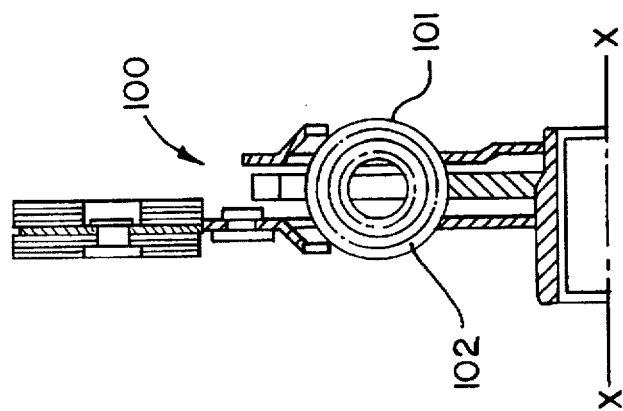
FIG. 3: a fragmentary axial sectional view of a clutch disc with a torsional vibration damper.

FIG. 3 is a fragmentary axial sectional view of a clutch disc 100 which can be utilized in the clutch 3 of FIG. 1 and comprises a torsional vibration damper 101 with at least one energy storing element 102 in the form of a coil spring. The line X—X denotes the axis of rotation of the clutch 3 and its clutch disc 100; the clutch rotates about the axis X—X in response to transmission of torque from the output element of the combustion engine 2. A clutch disc with a torsional vibration damper is disclosed, for example, in the aforementioned commonly owned U.S. Pat. No. 5,409,091 and in the aforementioned commonly owned U.S. Pat. No. 5,450,934. The clutch disc 100 is devoid of frictional damping means. The energy storing element or elements 102 can be designed in such a way that it exhibits or that they exhibit a single-stage or a multi-stage spring characteristic.

FIG. 4 is a diagram of the spring characteristic(s) of the energy storing element(s) 102 in the clutch disc 100 of FIG. 3. The torque (measured in Nm) which the clutch disc 100 can transmit within the angle of rotation of the input and output elements of the damper 101 relative to each other is measured along the ordinate, and the displacement of the input and output elements of the damper 101 relative to each other is measured (in degrees) along the abscissa. The curve 110 denotes the progress of a single-stage characteristic, and the curve 111 denotes the progress of a two-stage characteristic. The maximum torque (shown at 113) which can be transmitted by the damper 101 is less than the nominal torque (114) of the engine 2.

FIG. 5 is a flow chart wherein the blocks denote the steps of a method according to the present invention. The regulation or controlling of the operation of the torque transmitting apparatus is started at 200, and the block 201 denotes a monitoring or scanning step of ascertaining whether or not the RPM of the engine 2 is within that partial RPM range in which the clutch 3 is to operate with slip. If the answer to such monitoring is in the affirmative, the next step involves the adjustment of the clutch (block 202) for operation with slip. The block 203 denotes the monitoring or scanning step of ascertaining whether or not the RPM of the engine 2 is within a partial range in which the apparatus operates with torsional vibration resonance while the clutch 3 slips. If the answer to such monitoring is in the affirmative, the next step (block 204) involves an operation of the clutch 3 without slip before the operation is completed at 205. If the answer to the monitoring at 201 is in the negative (i.e., when the RPM of the engine 2 is not within that range in which the clutch 3 is to operate with slip), the operation is completed (block 205). The same holds true if the answer to the monitoring step at 203 is in the negative.

Figure 6:
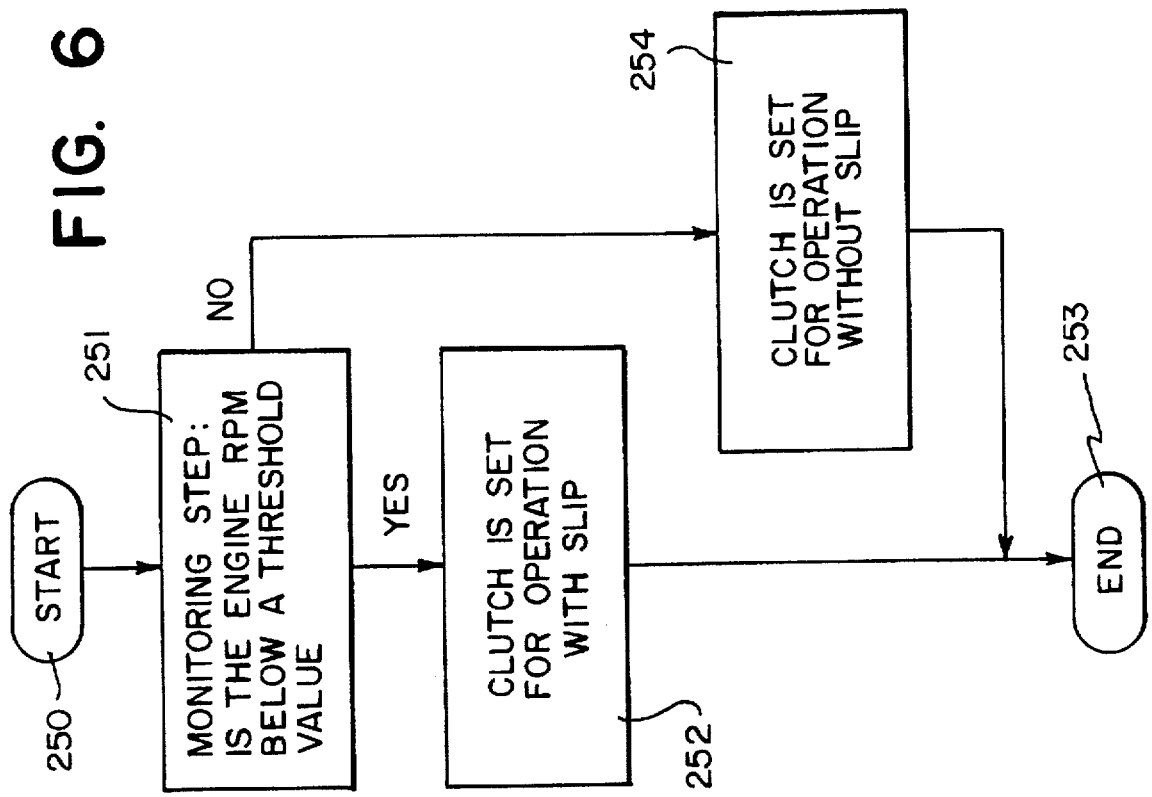
FIG. 6: a flow chart showing a different sequence of steps.

FIG. 6 is a flow chart wherein the blocks denote the following steps: The operation is started at 250, and the block 251 denotes the step of monitoring the RPM of the engine 2 in order to ascertain whether or not the RPM is below a threshold value. If the answer to such monitoring is in the affirmative, the next step (block 252) comprises operating the clutch 3 with slip in order to achieve a desirable damping of torsional vibrations. The operation is terminated at 253. If the answer to the monitoring at 251 is in the negative, the next step (block 254) involves a setting of the clutch for operation without slip, and the operation is completed at 253.

What is claimed is:

1. A method of regulating the operation of a torque transmitting apparatus which comprises a clutch operable with as well as without slip and having a clutch disc including a torsional vibration damper, the clutch receiving torque from a prime mover having a range of useful RPMs and a nominal torque range with irregularities including torsional vibrations tending to develop at least within a portion of said nominal torque range and the clutch transmitting torque to a power train, comprising a first step of dividing the range of RPMs into a plurality of partial ranges in dependency upon at least one characteristic value; a second stop of operating the clutch with slip within at least one of said partial ranges in which, in the absence of slip, the power train develops a torsional vibration resonance, for damping torsional vibrations developing within said at least one partial range; and a third step of damping torsional vibrations in at least one other partial range by resorting to at least one of the following: (a) operating the clutch without slip, and (b) intentionally preventing the operation of the clutch with slip to thus achieve a torque transmission by the clutch which is essentially free of slip, the apparatus otherwise exhibiting a torsional vibration resonance in the event of operation of the clutch with slip within said at least one other partial range.

2. The method of claim 1, wherein at least one of said second and third steps includes one of selecting, preventing and varying the slip within said partial ranges in dependency upon at least one of the characteristic RPMs, characteristic values and the progress of the RPM through specific threshold values.

3. The method of claim 1, wherein said first step comprises dividing the range of RPMs into two partial ranges including said at least one partial range and said at least one other partial range.

4. The method of claim 1, wherein the torsional vibration damper is devoid of frictional damping means.

5. The method of claim 1, wherein the torsional vibration damper is designed to perform a slight frictional damping action.

6. The method of claim 1, wherein the torsional vibration damper includes a damper having a maximum twisting moment less than the nominal torque of a combustion engine forming part of the prime mover.

7. The method of claim 1, wherein the torsional vibration damper has a maximum twisting torque less than the nominal torque of a combustion engine forming part of the prime mover.

8. The method of claim 1, wherein the torsional vibration damper includes a torsionally elastic vibration damping device having a single-stage spring characteristic.

9. The method of claim 1, wherein the torsional vibration damper has a multistage spring characteristic.

10. The method of claim 1, wherein the torsional vibration damper comprises at least one spring which is compressed when a vehicle embodying the torque transmission apparatus is pulling a load as well as when the vehicle is coasting.

11. The method of claim 1, further comprising the step of utilizing a control system to discriminate between the at least one partial range and the at least one other partial range on the basis of at least one of measurement signals and system values, said second and third steps including selecting the operation of the clutch with and without slip in dependency upon at least one of the measurement signals and system values.

12. The method of claim 1, wherein at least one of said second and third steps includes selecting, for the purpose of isolating vibrations, a slip below a threshold value of between 10 $min^{-1}$ and 200 $min^{-1}$.

13. The method of claim 12, wherein the slip is within a range of 20–150 $min^{-1}$.

14. The method of claim 12, wherein the slip is within a range of 20–100 $min^{-1}$.

15. The method of claim 11, wherein said second step includes operating the clutch with slip which is regulated in dependency upon at least one of the RPM of the prime mover, the torque of the prime mover, the temperature of the prime mover, the position of a movable throttle valve for an engine forming part of the prime mover, the velocity of changes of an angular position of a pivotable throttle valve for an engine forming part of the prime mover, the pressure in a suction manifold in an engine forming part of the prime mover, and the position of a multiple-position pedal for a combustion engine forming part of the prime mover.

16. The method of claim 1, wherein the slip with which the clutch is operated in the course of said second step exhibits a local maximum and decreases continuously toward at least one of two boundaries of the at least one partial range.

17. A method of regulating the operation of a torque transmission apparatus wherein a torsional vibration damper assembly including a clutch is operable with as well as without slip and wherein the damper assembly receives torque from a rotary component of a prime mover having a useful range of RPMs, comprising the steps of dividing the useful range into at least two partial ranges in dependency upon characteristic values, operating the clutch with slip within at least one of the partial ranges for damping of torsional vibrations wherein operation of said clutch without slip in said at least one of the partial ranges results in torsional resonant vibration and; operating the clutch without slip, for damping torsional vibrations in at least one other partial range wherein operation of said clutch with slip in said at least one partial ranges results in torsional resonant vibration.

18. The method of claim 11, wherein said measurement signals denote the RPM of the prime mover.

* * * * *